United States Patent [19]
Ozaki

[11] Patent Number: 4,495,141
[45] Date of Patent: Jan. 22, 1985

[54] TAGGING GAS RELEASING ELEMENT

[75] Inventor: Satoru Ozaki, Ichigawa, Japan

[73] Assignee: Doryokuro Kakunenryo Kaihatsu Jigyodan, Tokyo, Japan

[21] Appl. No.: 47,774

[22] Filed: Jun. 12, 1979

[30] Foreign Application Priority Data

Jun. 26, 1978 [JP] Japan .................. 53-77240

[51] Int. Cl.$^3$ .................. G21C 17/00; G21C 3/10
[52] U.S. Cl. .................. 376/251; 376/450
[58] Field of Search .................. 176/19 LD, 68, 80; 252/181.6; 427/6; 428/69; 376/251, 450

[56] References Cited

U.S. PATENT DOCUMENTS

| | | | |
|---|---|---|---|
| 1,958,967 | 5/1934 | Kniepen | 252/181.6 |
| 2,708,247 | 5/1955 | Bell . | |
| 3,311,541 | 3/1967 | Eyre | 176/19 LD |
| 3,356,585 | 12/1967 | Zebroski | 176/68 |
| 3,632,470 | 5/1968 | Rubin | 176/19 LD |
| 3,957,576 | 5/1976 | Boyer | 176/19 LD |
| 3,964,967 | 6/1976 | Nelson | 176/80 |
| 3,993,453 | 11/1976 | Ross | 176/68 |
| 4,065,352 | 12/1977 | Iwano | 176/68 |
| 4,163,689 | 8/1979 | Grossman | 176/68 |
| 4,302,295 | 11/1981 | Shimada | 376/450 |
| 4,312,707 | 1/1982 | Miyazawa | 376/450 |

FOREIGN PATENT DOCUMENTS 989393  4/1965  United Kingdom .................. 176/80

OTHER PUBLICATIONS

Condensed Chemical Dictionary, 8 ed., Van Nostrand Reinhold Co., N.Y., (1971), Hawley, pp. 19, 219, 467.
H. Winters et al., *Gas Incorporation into Sputtered Films*, 38, J. Appl. Phys., 3928, (No. 10, Sep. 1967), pp. 3928-3934.
I. Mitchell et al., *Gas Incorporation into Sputtered and Evaporated Gold Films*, 21, Vacuum at pp. 591-595, (No. 12, 1971 or 1972).
G. Heim et al., *Ion Implantation During Film Growth and Its Effect on the Superconducting Properties of Niobium*, 46, J. Appl. Phys. at pp. 4006-4012, (No. 9, Sep. 1975).
R. Kelly et al., *Diffusion in Inert Gas Bombarded Pt and Al*, 13, Phys. Stat. Sol. at pp. 55-69, (1966).
W. Lee et al., *Argon Entrapment in Metal Films by DC Triode Sputtering*, 46, J. Appl. Phys. at pp. 1728-1732, (No. 4, Apr. 1975).
The Engineer, ("Burst Slug Detection Equipment", article, p. 218, Feb. 1957).
Henault et al., Detection Instruments and Their Applications: Progress in Zenon Tagging, ANS Transactions, vol. 13, #2, pp. 797-798, Nov., 1970.
N. McCormick et al., "Gas Tag Identification . . . I through IV", 29, Nuclear Technology at pp. 200-208, (May 1976).

*Primary Examiner*—Sal Cangialosi
*Attorney, Agent, or Firm*—Wenderoth, Lind & Ponack

[57] ABSTRACT

A tagging gas releasing element which is contained in a nuclear fuel rod to release a tagging gas for detecting a failed fuel. The element comprises an inorganic solid material holding the tagging gas therein. The tagging gas is composed of a rare gas, and is held in the inorganic solid material in an injected or adsorbed state.

28 Claims, 6 Drawing Figures

TAGGING GAS RELEASING ELEMENT

BACKGROUND OF THE INVENTION

The present invention relates to a tagging gas releasing element for detection of a failed fuel, which element is contained in a nuclear fuel rod.

As a method for detecting failed or burst fuels, there is known a so-called tagging method which comprises laballing, or tagging nuclear fuel rods by a tagging gas, sensing leakage of the tagging gas, that is, breakage of a cladding tube of the nuclear fuel rod, by a sensing device disposed in the outside of the fuel rod, and determining a nuclear fuel assembly including the failed fuel rod (see, for example, U.S. patent application Ser. No. 729,317 filed on May 15, 1968).

A prior art method for introducing a tagging gas in a nuclear fuel rod is known in which the tagging gas is sealed in a capsule and, after assembling and sealing the capsule in the nuclear fuel rod, the tagging gas is released and filled in the nuclear fuel rod. For example, according to a method disclosed in French Patent Application No. 7223402, a tagging gas is filled in a capsule composed of a hardly fusible substance, the capsule is arranged within each fuel rod, and the tagging gas is released into the fuel rod through a passage of the capsule intercepted by an easily fusible seal having a melting point lower than the temperature for operating the fuel rod in a nuclear reactor. However, such a prior art tagging gas releasing element is defective in that the manufacture is very difficult because of a complicated structure of the capsule and since the capacity required of the element is large, designing of the nuclear fuel rod is remarkably limited.

SUMMARY OF THE INVENTION

It is therefore an object of the present invention to provide a tagging gas releasing element having a very simple structure easy to be manufactured.

It is another object of the present invention to provide a tagging gas releasing element having a diminished size which moderate limitations on designing of a nuclear fuel rod.

Briefly, a tagging gas releasing element according to the present invention comprises an inorganic solid material holding a tagging gas therein. The tagging gas is composed of a rare gas, and is injected or adsorbed in the inorganic solid material.

In the present invention, as the inorganic solid material, there may be employed metals such as titanium, aluminum, zirconium, nickel and stainless steel; alloys of these metals; films of these metals and alloys; and heat-resistant inorganic compound solids such as zeolite, activated carbon and boron nitride.

The tagging gas comprises rare gas including isotopes thereof such as, for example, xenon, krypton, neon or helium, or mixtures containing two or more of these rare gases at a predetermined mixing ratio.

Injection of the tagging gas into the inorganic solid material or adsorption of the tagging gas in the inorganic solid material may be performed according to an ion injection method, a high pressure induced diffusion method, a thermal diffusion method, a physical adsorption method or combination of these methods.

These and other objects and features of the present invention will be apparent from the description of the preferred embodiments of the invention, taken in conjunction with the accompanying drawings.

DETAILED DESCRIPTION OF THE INVENTION

Figure 1:
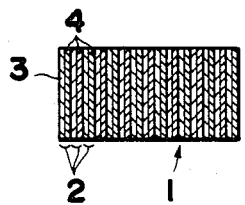
FIG. 1 is a schematic sectional view showing one embodiment of a tagging gas releasing element of the present invention.

Referring to FIG. 1 illustrating one embodiment of the tagging gas releasing element of the present invention, the tagging gas releasing element 1 comprises a number of circular thin discs 2 laminated closely to one another, and each circular thin disc comprises an injection substrate 3 and a tagging gas-injected layer 4 formed on the surface of the substrate 3. For formation of the injection substrate 3, there may be employed metals such as titanium, aluminum, zirconium, nickel and stainless steel; alloys of these metals; metal films formed by depositing these metals or alloys on surfaces of same or different metals or alloys or other solid carriers by using plating, sputtering, ion-plating or the like; and amorphous metals or heat-resistant solid having a high activity of adsorbing xenon, krypton or the like, such as zeolite, activated carbon and boron nitride (BN).

The tagging gas may be composed of at least two isotopes of a rare gas such as xenon, krypton, neon, helium or the like. One rare gas may be used singly, and a mixture comprising two or more rare gases at a predetermined mixing ratio may also be used. A mixture of stable isotopes of xenon and/or krypton is preferred.

Injection of the tagging gas into the substrate may be accomplished by using ion injection, high pressure induced diffusion, thermal diffusion, physical adsorption or combination of two or more of these methods.

When a thin metal film is used as the injection substrate, there can be attained an advantage that the film thickness can optionally be determined. When sputtering or ion-plating is adopted for formation of such thin metal film, a vacuum device or ion generating device may also be used for ion injection at the step of injecting the tagging gas into the thin metal film. It is therefore preferred to adopt the the sputtering method or ion-plating method for formation of the thin metal film. When a thin metal film is formed by using the plating method or ion-plating method, an amorphous metal film is resulted. If the operation of forming a thin metal film and the operation of injecting a tagging gas into the thin metal film are alternately repeated several times, a structure in which a plurality of gas-injected metal films are laminated as shown in FIG. 1 is effectively prepared. The ion injection method is most preferred as the method for injecting the tagging gas. According to this method, the tagging gas is ionized by, for example, low pressure gaseous discharge, the resulted ions are accelerated by an electric field, and thus the ions are held in an inorganic solid material by injection and/or adsorption. It is possible by this method to inject ions at such a degree as up to about 50% to the metal atoms, and the amount of the injected ions is much larger than that in other injection methods. In case of physical adsorption, there is a fear that the tagging gas once adsorbed is substituted by other gas during manufacture or storage of the element. Accordingly, a care must be taken so that such substitution of tagging gas is not caused.

Figure 2:
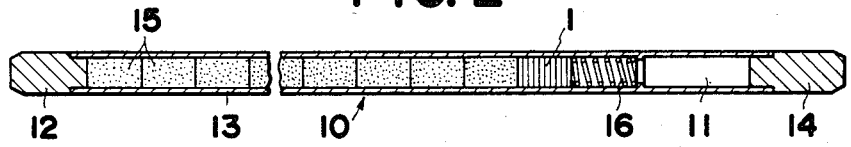
FIG. 2 is a sectional view illustrating a nuclear fuel rod in which the tagging gas releasing element shown in FIG. 1 is incorporated.

More definitely, when krypton-84 is accelerated at 50 KeV and is ion-injected into aluminum, the ions can be injected at a surface density of up to $1 \times 10^{17}$ ions per cm$^2$. Accordingly, when an aluminum foil having a diameter of 5 mm and a thickness of 6$\mu$ is employed as a thin metal disc, $5.4 \times 10^{19}$ ions of krypton are held in 2470 layers of aluminum foil to form a tagging gas releasing element having a height of about 16 mm. That is, 2 ml of krypton at 0° C. and 1 atmosphere are held. The thus held krypton is released at a temperature higher than about 340° C. Therefore, as shown in FIG. 2, when this gas releasing element 1 is disposed in a gas plenum 11 of a nuclear fuel rod 10, the tagging gas is released at an operation temperature of a fast reactor and is filled in the interior of the nuclear fuel rod 10. In FIG. 2, reference numerals 12, 13, 14, 15 and 16 represent a lower end plug, a cladding tube, an upper end plug, a nuclear fuel pellet and a plenum spring, respectively.

Release of the once injected or adsorbed tagging gas is caused by thermal diffusion releasing, high temperature desorption and melting of the metallic substrate under operation conditions of the unclear reactor, or by action of radiation, or by combination of these releasing mechanisms.

Figure 3:
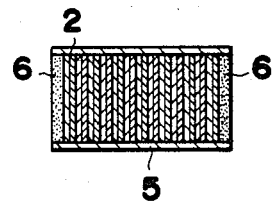
FIG. 3 is a sectional view illustrating another embodiment of the present invention.

FIG. 3 illustrates another embodiment of the present invention. In the case where the injected tagging gas is released by melting of the thin metal disc 2 of the injection substrate, a capsule is constructed by a cylinder 5 composed of a hardly fusible metal and porous walls 6 of the same hardly fusible metal formed on both ends of the cylinder 5, and a laminate of the thin discs 2 as shown in FIG. 1 is inserted into the capsule. If the compatibility between the thin metal disc 2 and the nuclear fuel pellet is poor, it is required to construct a capsule of a metal having a good compatibility, into which a laminate of the thin discs is inserted.

Figure 4:
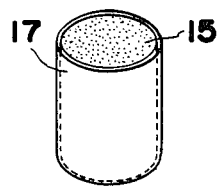
FIGS. 4 and 5 are diagrams illustrating further embodiments of the present invention.
Figure 5:
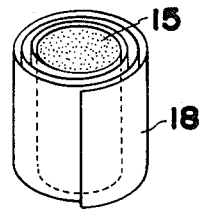
Figure 6:
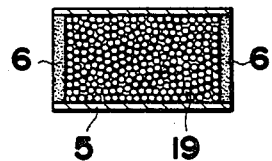
FIG. 6 is a sectional view illustrating still another embodiment of the present invention.

Since the amount of the tagging gas held in the injection substrate is generally in proportion to the surface area of the injection substrate, a large amount of the tagging gas can be effectively held by adopting a multi-layer structure as described in the foregoing embodiments. However, the present invention is not limited to such multi-layer structure, and the shape and size may optionally be changed according to the function of the gas releasing element. For example, as shown in FIG. 4, there may be adopted a structure in which a metal film 17 is applied on the surface of a nuclear fuel pellet 15 and a tagging gas is injected in the outer surface of the metal film 17. Further, as shown in FIG. 5, there may be adopted another structure in which a metal foil 18, in the outer surface of which a tagging gas has been previously injected, is helically wrapped around the peripheral surface of a nuclear fuel pellet 15. Moreover, as shown in FIG. 6, it is possible to charge a porous granular material 19, in which a tagging gas has been previously adsorbed, in a capsule same as that in FIG. 3.

As shown in foregoing, since the tagging gas is held by a solid material and release of the tagging gas depends mainly on the temperature determined by the holding solid material, the manufacture of the tagging gas releasing element of the present invention can be remarkably facilitated and the structure thereof can be remarkably simplified. Moreover, since the tagging gas is present in the substantially pressurized state in the solid, the size of the entire element can be remarkably diminished. Accordingly, limitations on designing of nuclear fuel rods can be moderated. For example, the dead space of the gas plenum can be remarkably reduced. Furthermore, the element is tough and strong, and has a good adaptability to operation, and release of the tagging gas can be accomplished with high reliability. Still in addition, a variety of tagging gases can optionally be combined by using unit solids for respective gases, and discrimination of tags can be performed very easily. Furthermore, by using the element of the present invention, the application range of the tagging method can be remarkably broadened. Thus, various effects and advantages can be attained according to the present invention.

While the present invention is described by exemplifying preferred embodiments, various modifications can be made without departing from the spirit and scope of the present invention.

What is claimed is:

1. A tagging gas releasing element for insertion within a nuclear fuel rod, said tagging gas releasing element consisting essentially of an inorganic solid material having a tagging gas composed of at least one rare gas selected from the group consisting of helium, xenon, neon and krypton adsorbed on the surface region thereof so as to detect failure in a nuclear fuel rod, said tagging gas being released from said element and into the interior of said fuel rod by means of desorption under the high temperature operation conditions of a nuclear reactor so as to tag each fuel rod and detect failure of the fuel rod when the tagging gas leaks therefrom, said inorganic solid material containing the tagging gas being the sole source of the tagging gas.

2. A tagging gas releasing element according to claim 1, wherein the inorganic solid material is a metal containing a tagging gas injected and entrained into the surface region thereof.

3. A tagging gas releasing element according to claim 2, wherein the metal is in the form of a thin film.

4. A tagging gas releasing element according to claim 3, wherein the thin metal film is formed on the surface of a solid carrier.

5. A tagging gas releasing element according to claim 3, wherein a number of thin metal films into which the tagging gas is injected and entrained into the surface region thereof are closely laminated to one another to form a multi-layer structure.

6. A tagging gas releasing element according to claim 3, wherein the thin metal film into which the tagging gas is injected forms a coating on the surface of a nuclear fuel pellet.

7. A tagging gas releasing element according to claim 3, wherein the thin metal film, in the outer surface of which the tagging gas is injected, is wrapped around the peripheral face of a nuclear fuel pellet.

8. A tagging gas releasing element according to claim 2, wherein the metal is selected from the group consisting of titanium, aluminum, zirconium, nickel, stainless steel and alloys thereof.

9. A tagging gas releasing element according to claim 1, wherein the inorganic solid material is a heat-resistant porous material in which the tagging gas is adsorbed.

10. A tagging gas releasing element according to claim 9, wherein the heat-resistant material is a heat-resistant porous granular material and the tagging gas is adsorbed in said porous granular material.

11. A tagging gas releasing element according to claim 10, wherein the tagging gas-adsorbed porous granular material is filled in a capsule comprising a cylinder composed of a hardly fusible metal and porous walls of the same metal disposed on both ends of said cylinder.

12. A tagging gas releasing element according to claim 1, wherein the tagging gas is a mixture of stable isotopes of at least one member selected from a group consisting of xenon and krypton.

13. A tagging gas releasing element according to claims 2 or 5 in which the tagging gas is injected and entrained onto the surface of said inorganic solid material by the ion injection method.

14. In a nuclear fuel rod composed of a cladding tube containing nuclear fuel pellets and a tagging gas composed of at least one rare gas selected from the group consisting of helium, xenon, neon and krypton, the improvement in which the tagging gas is entirely adsorbed onto the surface region of the tagging gas release element inserted into the cladding tube, said element composed of an inorganic solid material such that the tagging gas is released from said element by desorption under the high temperature operation conditions of a nuclear reactor to tag each fuel rod and detect failure of the fuel rod when the tagging gas leaks from the fuel rod.

15. The improvement according to claim 14 in which the inorganic solid material is a metal containing the tagging gas injected into the surface region of said metal.

16. The improvement according to claim 15 wherein the inorganic solid material is composed of a number of thin metal films formed on the surface of a solid carrier and in which a plurality of carrier and film combinations are closely laminated to one another to form a multi-layer structure.

17. The improvement according to claims 15 or 16 in which the tagging gas is injected into the surface of said metal or metal films by the ion injection method.

18. A fuel rod comprising a cladding tube and a fuel pellet material loaded in the cladding tube, characterized in that a metal foil having a tag gas injected therein for detecting breakage of the cladding tube is further loaded in the cladding tube, the metal foil being loaded in the cladding tube on the end portion in the form of circular foils, said foils each having a diameter smaller than the inner diameter of the cladding tube.

19. The fuel rod according to claim 18, wherein the metal foil is formed of a metal selected from the group consisting of aluminum, an aluminum alloy, zirconium, a zirconium alloy and stainless steel.

20. The fuel rod according to claim 18, wherein said tag gas is injected into a surface region of the metal foil.

21. The fuel rod according to claim 18, wherein said tag gas-injected metal foil is loaded in a plenum of the cladding tube.

22. A nuclear fuel rod, which comprises:
a cladding tube, filled with a tag gas and sealed at both ends; and a plurality of nuclear fuel pellets piled one atop another in the cladding tube, wherein an adsorbent carrying a tag gas for detecting a nuclear fuel rod failure is received in the inner space of the cladding tube above the nuclear fuel pellet pile whereby said gas is released from said adsorbent when the temperature thereof increases.

23. The nuclear rod according to claim 22, wherein the adsorbent is active carbon.

24. The nuclear rod according to claim 22, wherein the adsorbent is received in a container.

25. The nuclear rod according to claim 24, wherein the container is formed of a hardly fusible metal container which is perforated at the top.

26. The nuclear rod according to claim 22 wherein the tag gas is at least one member selected from the group consisting of helium, xenon and krypton.

27. The fuel rod according to claim 19, wherein said tag gas-injected metal foil is loaded in a plenum of the cladding tube.

28. The fuel rod according to claim 20, wherein said tag gas-injected metal foil is loaded in a plenum of the cladding tube.

* * * * *